WITNESSES:
W. M. Gentle
O. M. McLaughlin

INVENTOR.
Alexander L. Heizer
BY
V. H. Lockwood
ATTORNEY.

WITNESSES:

INVENTOR.
Alexander L. Heizer.
BY
ATTORNEY.

A. L. HEIZER.
IGNITION MAGNETO.
APPLICATION FILED AUG. 26, 1909.

1,060,182.

Patented Apr. 29, 1913.
4 SHEETS—SHEET 4.

WITNESSES:
W. M. Gentle
O. M. McLaughlin

INVENTOR.
Alexander L. Heizer.
BY
V. H. Lockwood
ATTORNEY.

UNITED STATES PATENT OFFICE.

ALEXANDER L. HEIZER, OF ANDERSON, INDIANA, ASSIGNOR TO VESTA ACCUMULATOR COMPANY, A CORPORATION OF ILLINOIS.

IGNITION-MAGNETO.

1,060,182.

Specification of Letters Patent. Patented Apr. 29, 1913.

Application filed August 26, 1909. Serial No. 514,736.

*To all whom it may concern:*

Be it known that I, ALEXANDER L. HEIZER, of Anderson, county of Madison, and State of Indiana, have invented a certain new and useful Ignition-Magneto; and I do hereby declare that the following is a full, clear, and exact description thereof, reference being had to the accompanying drawings, in which like letters refer to like parts.

The object of this invention is to improve the construction of ignition apparatus for combustion engines so that a uniform spark will be obtained at all times and under all conditions of adjustment.

The chief feature of the invention relates to the correlation of the armature core, the pole pieces and the timing mechanism. The relative positions of these parts are varied. Not only is the timing mechanism adjustable angularly relatively to the armature shaft, and the pole pieces likewise adjustable relatively to the armature shaft and core, but also, the timing mechanism is adjustable relatively to the pole pieces. The timing mechanism moves the pole pieces for adjustment, but there is a certain limit of movement of the timing mechanism independently of the pole pieces. Hence, when the timer is in its retarded position, the armature and movable pole pieces are in such relation to each other as to give a full spark at the starting of the motor, whether by cranking the engine or otherwise. After the motor has started the timer may be advanced say about twenty-five degrees on the armature shaft without any corresponding movement of the pole pieces. But the further movement of the timer beyond said twenty-five degrees advance also advances the pole pieces without changing the character of the spark. Likewise, the return movement of the timer for about twenty-five degrees does not cause the corresponding return of the pole pieces, but the further return movement of the timer returns the pole pieces therewith. This construction gives a uniform full spark at all stages of the timing adjustment.

Figure 1:
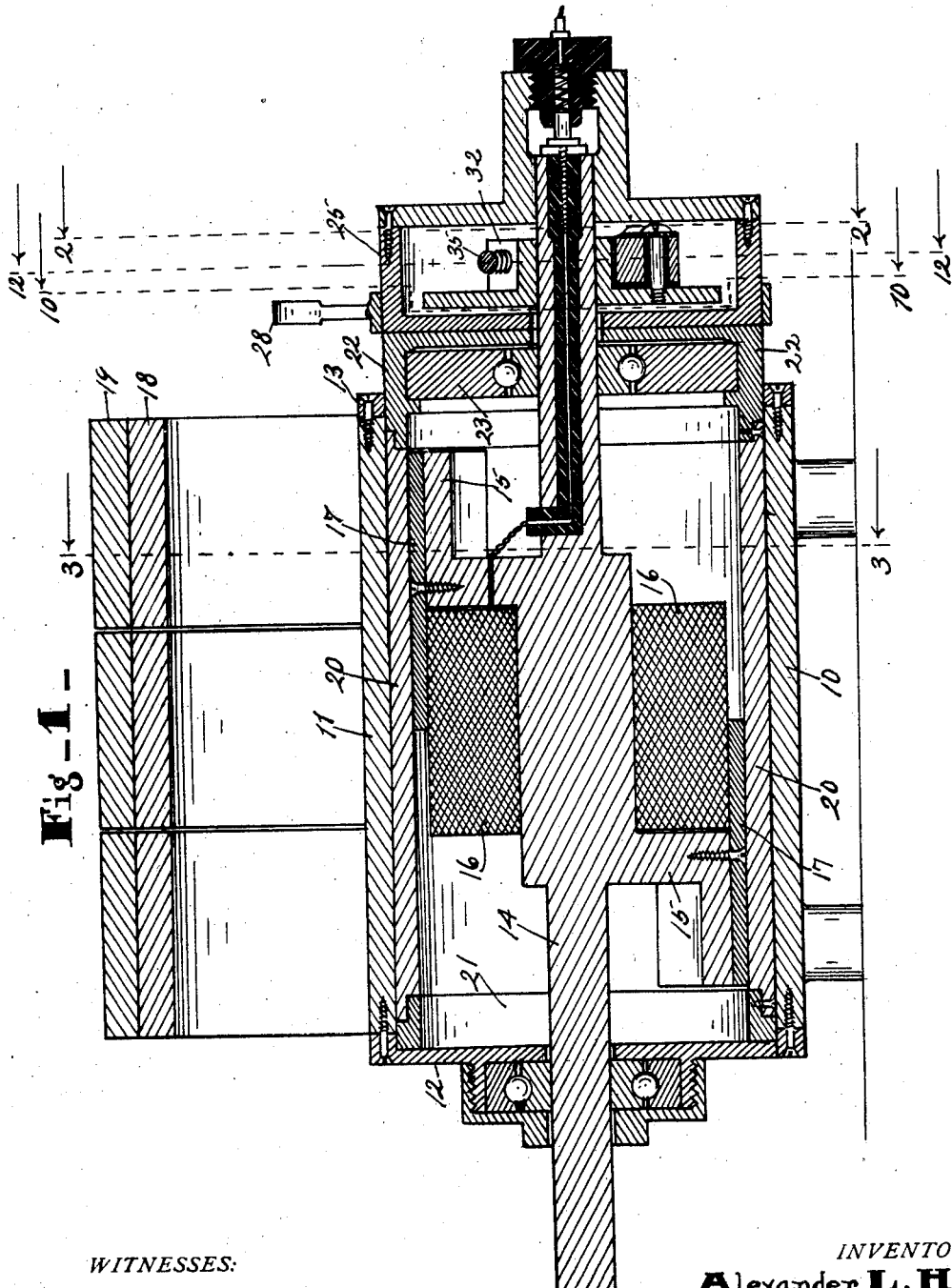
Figure 2:
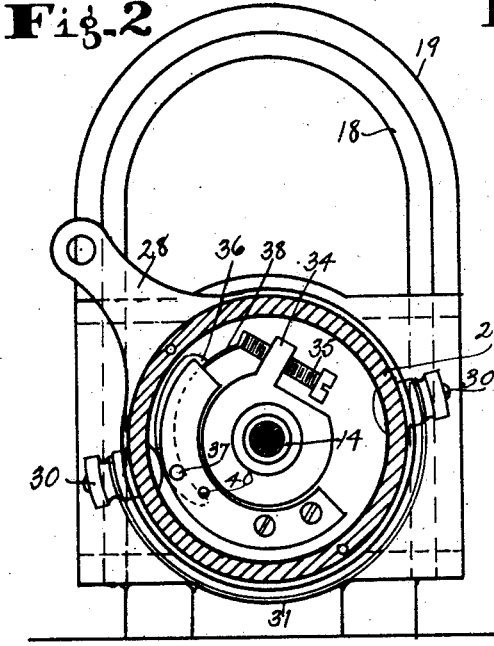
Figure 4:
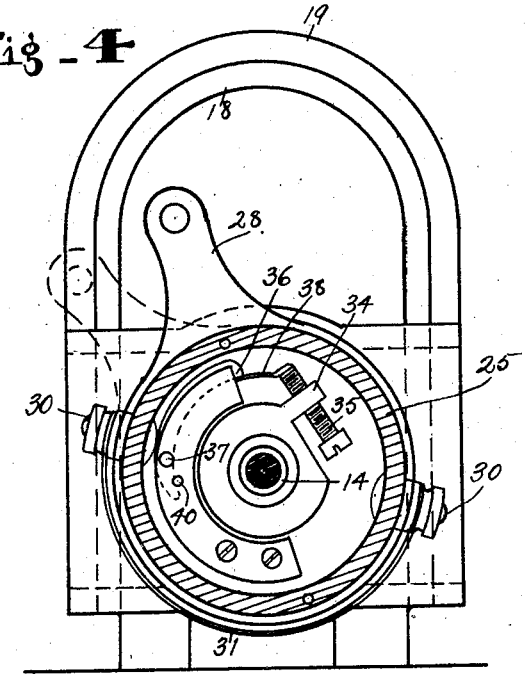
Figure 3:
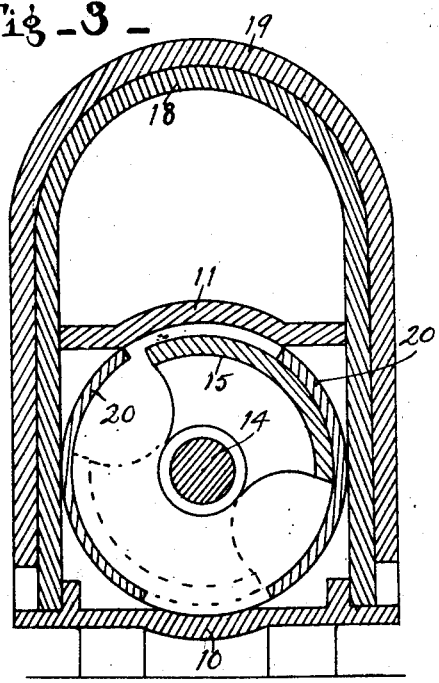
Figure 5:
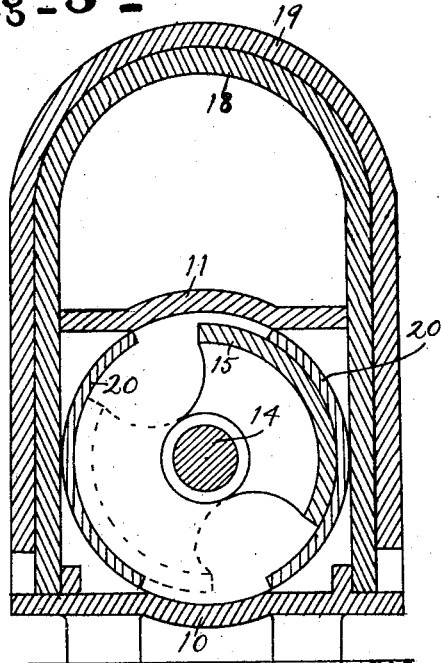
Figure 6:
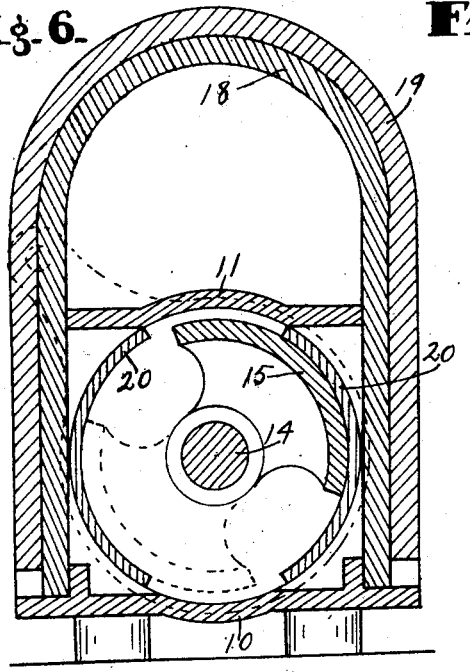
Figure 7:
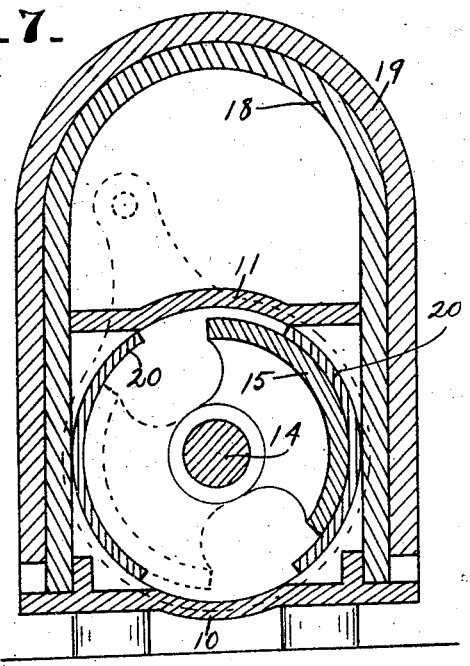
Figure 8:
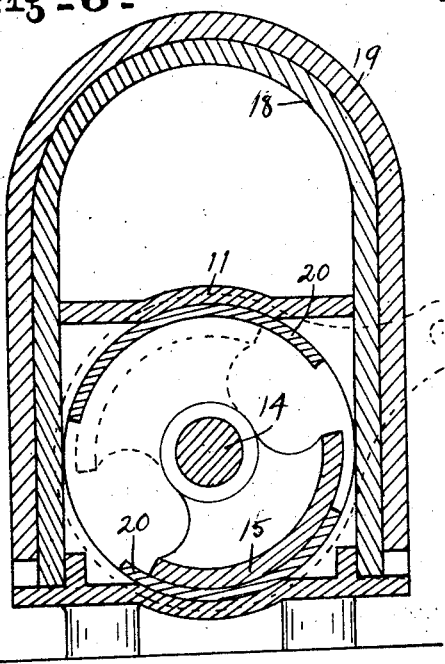
Figure 9:
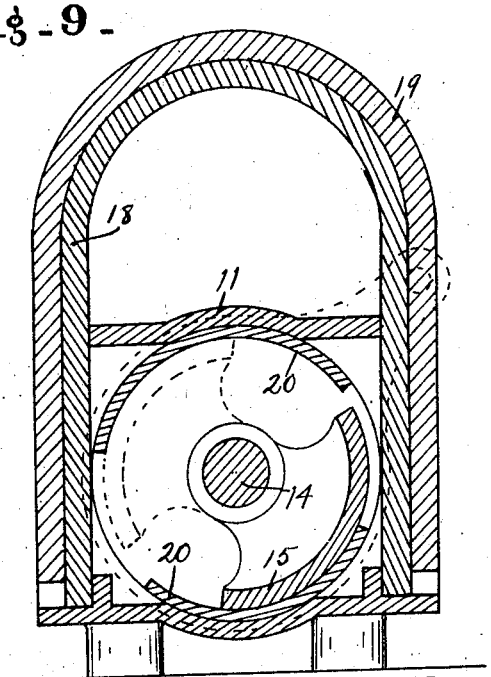
Figure 10:
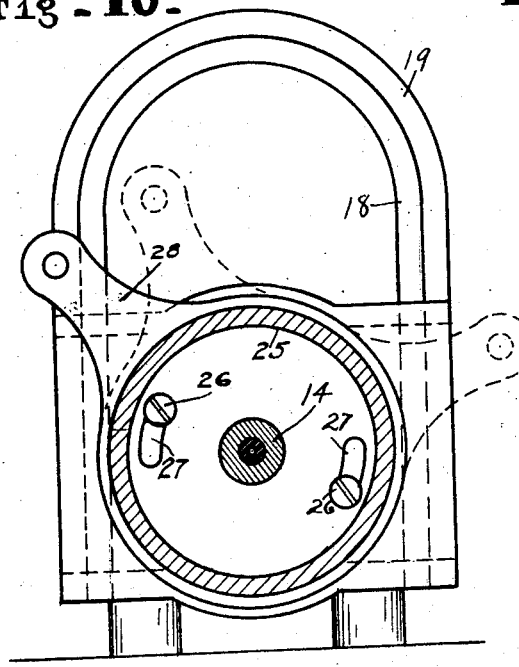
Figure 11:
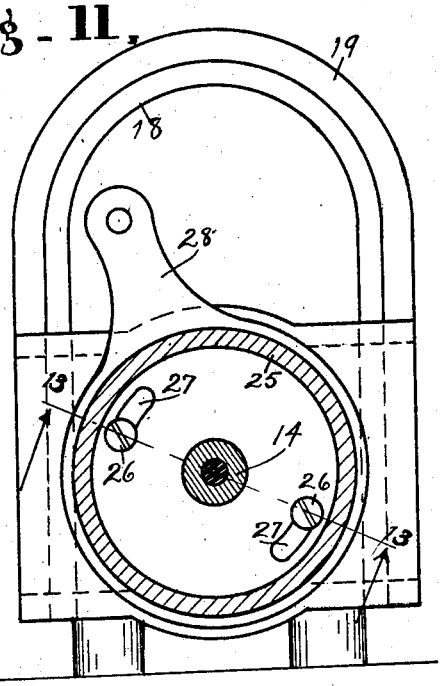
Figure 12:
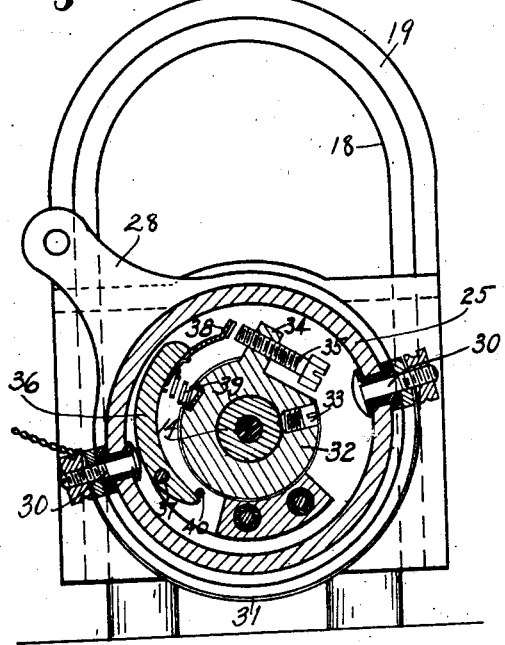
Figure 13:
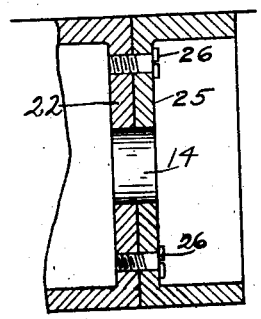

The details of the invention will be understood from the accompanying drawings and the following description and claims:

In the drawings Figure 1 is a central vertical longitudinal section through a magneto. Figure 2 is a vertical transverse section on the line 2—2 of Figure 1 showing the timer at the starting position. Figure 3 is a section on the line 3—3 of Figure 1 showing the relative positions of the armature and pole pieces at the starting position corresponding to Figure 2. Figure 4 is a section the same as Figure 2 with the timer advanced about twenty-five degrees from the starting position and without advancing the poles. Figure 5 is the same as Figure 3 showing the relative positions of the armature and pole pieces to correspond with the position of the timer shown in Figure 4. Figures 6 and 7 are sections similar to Figures 3 and 5, showing the armatures in slightly different positions. Figure 8 is a section similar to Figures 3, 5, and 6, showing the poles and timer fully advanced. Figure 9 is a section similar to Figure 8, but showing the timer slightly retarded without effecting the adjustment of the poles as is indicated by the difference of position of the levers shown in dotted lines in the two figures. Figure 10 is a section on the line 10—10 of Figure 1 showing the timer at the starting position. Figure 11 is the same as Figure 10 with the timer moved about twenty-five degrees. Figure 12 is a section on the line 12—12 of Figure 1. Figure 13 is a section on the line 13—13 of Figure 11.

In detail, a casing is provided consisting of a bottom portion 10, top portion 11 and an end portion 12, in which the armature shaft 14 is suitably mounted. At the other end of the casing there is a ring 13 detachably mounted. The armature has a winged core 15 with a peripheral winding 16. The wings of the core project in opposite positions and have on them a plate 17 which, so far as my present invention is concerned, may be referred to as a part of the armature. The device is provided with an internal series of magnets 18 and an external series 19.

None of the features of construction of the foregoing parts of the device form any essential part of this invention, and they may be modified as desired.

The pole pieces 20 are not stationary but oscillatable in the casing, being mounted at one end on a ring 21 that can turn in the casing, and at the other end being mounted on an angular end piece 22 which can oscillate in the ring 13, and which contains a bearing construction 23 for one end of the armature shaft. Therefore, the pole pieces 20, ring 21 and the end piece or ring 22 are practically one construction.

The timing mechanism includes a hollow disk 25 which is mounted on the end piece or ring 22, as indicated in Figures 10 and 11, by means of screws 26 secured in said end piece and projecting through slots 27 in the timing disk 25. Said slots are concentric with the center of said disk 25 and limit the independent movement of the timing mechanism relatively to the pole pieces. Said timing mechanism is oscillated by the arm 28 secured thereto. The slots 27 are made long enough in the construction shown to permit about twenty-five degrees movement of the timer before it begins to move the pole pieces. That is true whether it occurs at the beginning of the advance movement of the timer or at the beginning of the return or retard movement thereof.

The timing disk 25 has an outwardly extending flange on the peripheral edge thereof, through which terminals 30 extend that are connected with each other by wire 31. These terminals are insulated from the disk 25 and have a contact head projecting inwardly therefrom. There is also a sleeve 32 projecting from the central portion of said disk 25 and immediately surrounding the armature shaft and secured thereto by a screw 33, so that the disk 25 is in electrical communication with the shaft 14. The sleeve 32 has an ear 34 projecting therefrom containing an adjustable contact screw 35. A curved lever 36 is pivoted on the pin 37 in the disk 25 between the sleeve 32 and the outer flange and in position to engage and be actuated by the heads on the terminals 30, and when it is thus actuated, the contact spring 38 comes in engagement with the screw 35. and when the actuation of the lever 36 ceases, said parts 35 and 38 are separated by the spring 39, which forces the free end of the lever 36 outwardly. The movement of the lever 36 is limited by the pin 40 in the disk 25 engaging the heel of the lever 36.

The operation and regulation of the device is as follows: The parts are in the starting position when they are as indicated in Figures 2 and 3. Then the gap between the armature core and pole pieces is relatively small at the moment of sparking, and will produce a full spark upon the cranking of the engine or the initial operation of the armature. When the magneto is thus started it is regulated in the matter of timing by movement of the arm 28. The first movement is from the position shown in Figure 2 to that shown in Figure 4, that is, from the position shown in Figure 10 to that shown in Figure 11, as far as the slots 27 will permit, which in the form herein shown is about twenty-five degrees. That movement of the timer does not change the position of the pole pieces 20, but it does change the gap between the pole pieces at the moment of sparking, and the core of the armature, as appears in Figure 5. But under increased speed this gap makes substantially the same uniform spark as before. As the speed increases, the timer is advanced farther, being moved from the position shown in Figure 4 to the position shown in Figure 6, or to the desired limit of movement, which may be to any extent, say about ninety degrees. That additional advance of the timer causes a corresponding advance of the pole pieces, so that the gap between the pole pieces and core of the armature at the moment of sparking will continue to be the same as in the former position of the timer, that is, as shown in Figure 5. In the return that is, as shown in Figure 5. In the return movement the timer moves about 25° before it begins to move the pole pieces, going to the position shown in Figure 9. The further return movement of the timer causes the pole pieces to be returned by it to the original position shown in Figure 3.

What I claim as my invention and desire to secure by Letters Patent is:

1. An ignition magneto comprising a rotary armature, shaft and core, oscillatable pole pieces, an oscillatable timing mechanism and mechanism for oscillating the timing mechanism relatively of the pole pieces for a predetermined distance and then oscillating the timing mechanism and pole pieces together.

2. An ignition magneto including a rotary armature shaft and core, oscillatable pole pieces, members rigidly connecting the pole pieces to oscillate together, a timing mechanism, and means adapted to oscillate the timing mechanism a predetermined distance independent of the pole pieces, and then oscillate the pole pieces and timing mechanism simultaneously.

3. An ignition magneto including a rotary armature shaft and core, oscillatable pole pieces, members connecting the pole pieces to oscillate together, a timer mounted near the end of said armature shaft, a terminal carried by the timer, means on the shaft for making and breaking the circuit, a connection between the timer and one of said members adapted to permit the timer to move for a predetermined distance independent of the pole pieces and then move the timing mechanism and pole pieces together, and an arm for actuating the same.

4. In a magneto the combination with the armature of adjustable pole pieces, rings rigidly secured to the pole pieces, an adjustable timing mechanism connected with one of the rings and means adapted to adjust the timing mechanism independently thereof to a predetermined point and then adjust the pole pieces therewith.

5. In a magneto the combination with the armature of oscillatable pole pieces, rings connected to the pole pieces, a timing mechanism, part of which is oscillatable and connected with one of said rings, and means for oscillating the oscillatable part of the timing mechanism to a predetermined point independently of the pole pieces and then oscillate the pole pieces therewith.

6. In a magneto the combination with a casing, of an armature therein, a plurality of rings, one journaled in each end of the casing, pole pieces connecting the rings, a member connected to one of the rings to rotate independently thereof a predetermined distance and then to rotate the ring therewith to shift the position of the pole pieces and a timing mechanism inclosed by said member, part of the timing mechanism secured to the armature shaft and part to the member.

7. In a magneto, adjustable pole pieces, rings secured to said pole pieces, an adjustable timing mechanism and a screw and slot connection between one of said rings and the timing mechanism adapted to permit the timing mechanism to be advanced or retarded relatively of the pole pieces a predetermined distance and adapted to permit the advance or retard of the timing mechanism and pole pieces together after the limit of the relative advancement or retardation of the timing mechanism is effected.

8. In a magneto an armature shaft, an armature thereon, oscillatable pole pieces, members rigidly connecting the pole pieces to oscillate together, an element journaled on one end of the armature shaft, a screw and slot connection between the element and one of said members adapting the element to move a distance independently of the member and to move the member therewith after such independent movement and a timing mechanism, part thereof rotatable with the armaaure shaft and part secured to the element.

9. In a device of the class described, a casing, an armature therein, a plurality of rings, oscillatable pole pieces connecting the rings, a hollow disk journaled on one end of the armature shaft, a connection between the disk and one of the rings adapted to permit the disk to move a distance independently of the ring and to permit the ring to move therewith after such movement and an arm on said disk for effecting movement.

10. In a magneto an armature, adjustable pole pieces, members connecting the pole pieces to oscillate together, a timing mechanism, a pin and slot connection between the timing mechanism and one of said members adapted to permit a relative adjustment between the pole pieces and timing mechanism, and an arm for oscillating the timing mechanism relatively of the pole pieces for a predetermined distance and then oscillating the timing mechanism and pole pieces together.

11. In a magneto, an armature, oscillatable pole pieces, members connecting the pole pieces to oscillate together, an oscillatable timing mechanism, a pin and slot connection connecting a part of the timing mechanism and one of said members to permit a limited relative oscillation between the pole pieces and timing mechanism and an arm adapted to oscillate the pole pieces and timing mechanism together after a limited relative oscillation.

12. In a device of the class described, an armature shaft, an armature thereon, oscillatable pole pieces, rings connecting said pole pieces to oscillate together, a disk journaled on the end of said armature shaft, a screw and slot connection between the disk and one of said rings adapted to permit the disk to move independently of the ring and to move the ring therewith after such independent movement, an outwardly directed peripheral flange on the outer end of said disk terminals on said flange each having a contact on the inner end thereof, a wire connecting said terminals, a sleeve secured upon said shaft, an ear projecting therefrom, an adjustable contact screw secured on said ear, a curved lever pivoted on said disk between said sleeve and said flange and in position to engage and to be actuated by the contacts of the terminals on the flange, and a contact spring secured on said lever adapted to contact the contact screw when the lever is actuated.

13. In a device of the class described, an armature shaft, an armature thereon, oscillatable pole pieces, members connecting said pole pieces, a disk journaled on the end of said armature shaft, a connection between the disk and one of said members adapted to permit the disk to move independently of the member and to move the member therewith after such independent movement, an outwardly directed peripheral flange on the outer end of said disk, terminals on said flange, each having a contact on the inner end thereof, a wire connecting said terminals, a sleeve secured upon said shaft, an ear projecting therefrom, contact screws secured on said ear, a lever pivoted on said disk in position to engage and to be actuated by the contacts of the terminals on the flange, and a contact spring secured on said lever adapted to contact the contact screw when the lever is actuated.

14. In a device of the class described, an armature shaft, an armature thereon, oscillatable pole pieces, rings connecting said pole pieces, a disk journaled on the end of said armature shaft, a connection between the disk and one of said rings adapted to permit the disk to move independently of the ring and to move the ring therewith after such independent movement, a flange on the outer end of said disk, terminals on said flange, each having a contact on the inner end thereof, a sleeve secured upon said shaft, an ear integral therewith, adjustable contact screw secured on said ear and a lever pivoted on said disk between said sleeve and said flange and in position to engage and to be actuated by the contacts of the terminals on the flange.

15. In a device of the class described, a casing, an armature shaft therein, an armature on said shaft, oscillatable pole pieces, members connecting said poles to oscillate together, a disk journaled on the end of said armature shaft, a pin and slot connection between the disk and one of said rings adapted to permit the disk to move independently of the ring and to move the ring therewith after such independent movement, a flange on the outer end of said disk, terminals on said flange, each having a contact on the inner end thereof, a sleeve secured upon said shaft, a lug projecting therefrom, an adjustable contact screw secured on said lug, and a contact spring secured on said lever adapted to contact the contact screw when the lever is actuated.

In witness whereof, I have hereunto affixed my signature in the presence of the witnesses herein named.

ALEXANDER L. HEIZER.

Witnesses:
G. H. BOINK,
V. H. LOCKWOOD.